US008591069B2

(12) United States Patent
Horn

(10) Patent No.: US 8,591,069 B2
(45) Date of Patent: Nov. 26, 2013

(54) LED LIGHT BULB WITH CONTROLLED COLOR DISTRIBUTION USING QUANTUM DOTS

(75) Inventor: David Horn, Saratoga, CA (US)

(73) Assignee: Switch Bulb Company, Inc., San Jose, CA (US)

( * ) Notice: Subject to any disclaimer, the term of this patent is extended or adjusted under 35 U.S.C. 154(b) by 194 days.

(21) Appl. No.: 13/239,288

(22) Filed: Sep. 21, 2011

(65) Prior Publication Data

US 2013/0070450 A1 Mar. 21, 2013

(51) Int. Cl.
*F21V 29/00* (2006.01)
*F21V 33/00* (2006.01)
*B60Q 1/06* (2006.01)

(52) U.S. Cl.
USPC .............................. 362/294; 362/373; 362/101

(58) Field of Classification Search
None
See application file for complete search history.

(56) References Cited

U.S. PATENT DOCUMENTS

| | | |
|---|---|---|
| 3,962,675 A | 6/1976 | Rowley et al. |
| 4,025,290 A | 5/1977 | Giangiulio |
| 4,039,885 A | 8/1977 | van Boekhold et al. |
| 4,077,076 A | 3/1978 | Masters |
| 4,211,955 A | 7/1980 | Ray |
| 4,271,458 A | 6/1981 | George, Jr. |
| 4,290,095 A | 9/1981 | Schmidt |
| 4,325,107 A | 4/1982 | MacLeod |
| 4,336,855 A | 6/1982 | Chen |
| 4,346,329 A | 8/1982 | Schmidt |
| 4,405,744 A | 9/1983 | Greinecker et al. |
| 4,511,952 A | 4/1985 | Vanbragt |
| 4,539,516 A | 9/1985 | Thompson |
| 4,611,512 A | 9/1986 | Honda |
| 4,647,331 A | 3/1987 | Koury, Jr. et al. |
| 4,650,509 A | 3/1987 | Vanbragt |
| 4,656,564 A | 4/1987 | Felder |
| 4,658,532 A | 4/1987 | McFarland et al. |
| 4,663,558 A | 5/1987 | Endo |
| 4,727,289 A | 2/1988 | Uchida |
| 4,728,999 A | 3/1988 | Dannatt et al. |
| 4,840,383 A | 6/1989 | Lombardo |
| 4,843,266 A | 6/1989 | Szanto et al. |
| 4,875,852 A | 10/1989 | Ferren |
| 4,876,632 A | 10/1989 | Osterhout et al. |
| 4,904,991 A | 2/1990 | Jones |
| 4,916,352 A | 4/1990 | Haim et al. |
| 4,942,685 A | 7/1990 | Lin |

(Continued)

FOREIGN PATENT DOCUMENTS

EP 0658933 B1 10/2001
JP 63-86484 A 4/1988

(Continued)

OTHER PUBLICATIONS

Final Office Action received for U.S. Appl. No. 12/299,049, mailed on Jan. 4, 2012, 24 pages.

(Continued)

*Primary Examiner* — Britt D Hanley
(74) *Attorney, Agent, or Firm* — Morrison & Foerster LLP

(57) ABSTRACT

A liquid-cooled LED bulb including a base and a shell connected to the base forming an enclosed volume. The liquid-cooled LED bulb also includes a plurality of LEDs attached to the base and disposed within the shell. The LED bulb also includes a thermally-conductive liquid held within the enclosed volume and a quantum dot material for adjusting the wavelength of light emitted from LED bulb.

15 Claims, 9 Drawing Sheets

(56) References Cited

U.S. PATENT DOCUMENTS

| | | |
|---|---|---|
| 4,947,300 A | 8/1990 | Wen |
| 4,967,330 A | 10/1990 | Bell et al. |
| 4,994,705 A | 2/1991 | Linder et al. |
| 5,008,588 A | 4/1991 | Nakahara |
| 5,065,226 A | 11/1991 | Kluitmans et al. |
| 5,075,372 A | 12/1991 | Hille et al. |
| 5,119,831 A | 6/1992 | Robin et al. |
| 5,136,213 A | 8/1992 | Sacchetti |
| 5,224,773 A | 7/1993 | Arimura |
| 5,237,490 A | 8/1993 | Ferng |
| 5,303,124 A | 4/1994 | Wrobel |
| 5,358,880 A | 10/1994 | Lebby et al. |
| 5,377,000 A | 12/1994 | Berends |
| 5,405,208 A | 4/1995 | Hsieh |
| 5,463,280 A | 10/1995 | Johnson |
| 5,496,184 A | 3/1996 | Garrett et al. |
| 5,514,627 A | 5/1996 | Lowery et al. |
| 5,528,474 A | 6/1996 | Roney et al. |
| 5,561,347 A | 10/1996 | Nakamura et al. |
| 5,585,783 A | 12/1996 | Hall |
| 5,622,423 A | 4/1997 | Lee |
| 5,630,660 A | 5/1997 | Chen |
| 5,662,490 A | 9/1997 | Ogawa |
| 5,664,866 A | 9/1997 | Reniger et al. |
| 5,667,295 A | 9/1997 | Tsui |
| 5,684,354 A | 11/1997 | Gleckman |
| 5,685,637 A | 11/1997 | Chapman et al. |
| 5,688,042 A | 11/1997 | Madadi et al. |
| 5,726,535 A | 3/1998 | Yan |
| 5,803,588 A | 9/1998 | Costa |
| 5,807,157 A | 9/1998 | Penjuke |
| 5,887,967 A | 3/1999 | Chang |
| 5,890,794 A | 4/1999 | Abtahi et al. |
| 5,892,325 A | 4/1999 | Gleckman |
| 5,899,557 A | 5/1999 | McDermott |
| 5,929,568 A | 7/1999 | Eggers |
| 5,931,562 A | 8/1999 | Arato |
| 5,931,570 A | 8/1999 | Yamuro |
| 5,936,599 A | 8/1999 | Reymond |
| 5,941,626 A | 8/1999 | Yamuro |
| 5,947,588 A | 9/1999 | Huang |
| 5,952,916 A | 9/1999 | Yamabe |
| 5,963,126 A | 10/1999 | Karlin et al. |
| 5,982,059 A | 11/1999 | Anderson |
| 5,984,494 A | 11/1999 | Chapman et al. |
| 6,003,033 A | 12/1999 | Amano et al. |
| 6,043,591 A | 3/2000 | Gleckman |
| 6,087,764 A | 7/2000 | Matei |
| 6,095,671 A | 8/2000 | Hutain |
| 6,102,809 A | 8/2000 | Nichols |
| 6,120,312 A | 9/2000 | Shu |
| 6,123,631 A | 9/2000 | Ginder |
| 6,147,367 A | 11/2000 | Yang et al. |
| 6,158,451 A | 12/2000 | Wu |
| 6,183,310 B1 | 2/2001 | Shu |
| 6,184,628 B1 | 2/2001 | Ruthenberg |
| 6,227,679 B1 | 5/2001 | Zhang et al. |
| 6,254,939 B1 | 7/2001 | Cowan et al. |
| 6,258,699 B1 | 7/2001 | Chang et al. |
| 6,268,801 B1 | 7/2001 | Wu |
| 6,273,580 B1 | 8/2001 | Coleman et al. |
| 6,276,822 B1 | 8/2001 | Bedrosian et al. |
| 6,277,685 B1 | 8/2001 | Lin et al. |
| 6,313,892 B2 | 11/2001 | Gleckman |
| 6,316,911 B1 | 11/2001 | Moskowitz et al. |
| 6,332,692 B1 | 12/2001 | McCurdy |
| 6,338,647 B1 | 1/2002 | Fernandez et al. |
| 6,357,902 B1 | 3/2002 | Horowitz |
| 6,382,582 B1 | 5/2002 | Brown |
| 6,426,704 B1 | 7/2002 | Hutchison |
| 6,471,562 B1 | 10/2002 | Liu |
| 6,478,449 B2 | 11/2002 | Lee et al. |
| 6,480,389 B1 | 11/2002 | Shie et al. |
| 6,488,392 B1 | 12/2002 | Lu |
| 6,496,237 B1 | 12/2002 | Gleckman |
| 6,504,301 B1 | 1/2003 | Lowery |
| 6,513,955 B1 | 2/2003 | Waltz |
| 6,528,954 B1 | 3/2003 | Lys et al. |
| 6,534,988 B2 | 3/2003 | Flory, IV |
| 6,541,800 B2 | 4/2003 | Barnett et al. |
| 6,547,417 B2 | 4/2003 | Lee |
| 6,568,834 B1 | 5/2003 | Scianna |
| 6,582,100 B1 | 6/2003 | Hochstein et al. |
| 6,608,272 B2 | 8/2003 | Garcia |
| 6,612,712 B2 | 9/2003 | Nepil |
| 6,619,829 B1 | 9/2003 | Chen |
| 6,626,557 B1 | 9/2003 | Taylor |
| 6,639,360 B2 | 10/2003 | Roberts et al. |
| 6,655,810 B2 | 12/2003 | Hayashi et al. |
| 6,659,632 B2 | 12/2003 | Chen |
| 6,685,852 B2 | 2/2004 | Setlur et al. |
| 6,709,132 B2 | 3/2004 | Ishibashi |
| 6,711,426 B2 | 3/2004 | Benaron et al. |
| 6,713,961 B2 | 3/2004 | Honda et al. |
| 6,734,633 B2 | 5/2004 | Matsuba et al. |
| 6,741,029 B2 | 5/2004 | Matsubara et al. |
| 6,742,907 B2 | 6/2004 | Funamoto et al. |
| 6,746,885 B2 | 6/2004 | Cao |
| 6,750,824 B1 | 6/2004 | Shen |
| 6,773,192 B1 | 8/2004 | Chao |
| 6,786,625 B2 | 9/2004 | Wesson |
| 6,789,348 B1 | 9/2004 | Kneller et al. |
| 6,791,259 B1 | 9/2004 | Stokes et al. |
| 6,791,283 B2 | 9/2004 | Bowman et al. |
| 6,793,362 B2 | 9/2004 | Tai |
| 6,793,363 B2 | 9/2004 | Jensen |
| 6,796,698 B2 | 9/2004 | Sommers et al. |
| 6,805,461 B2 | 10/2004 | Witte |
| 6,819,049 B1 | 11/2004 | Bohmer et al. |
| 6,819,056 B2 | 11/2004 | Lin |
| 6,828,590 B2 | 12/2004 | Hsiung |
| 6,864,513 B2 | 3/2005 | Lin et al. |
| 6,864,554 B2 | 3/2005 | Lin et al. |
| 6,881,980 B1 | 4/2005 | Ting |
| 6,886,963 B2 | 5/2005 | Lodhie |
| 6,903,380 B2 | 6/2005 | Barnett et al. |
| 6,905,231 B2 | 6/2005 | Dickie |
| 6,910,794 B2 | 6/2005 | Rice |
| 6,911,678 B2 | 6/2005 | Fujisawa et al. |
| 6,911,915 B2 | 6/2005 | Wu et al. |
| 6,926,973 B2 | 8/2005 | Suzuki et al. |
| 6,927,683 B2 | 8/2005 | Sugimoto et al. |
| 6,932,638 B1 | 8/2005 | Burrows et al. |
| 6,936,857 B2 | 8/2005 | Doxsee et al. |
| 6,943,357 B2 | 9/2005 | Srivastava et al. |
| 6,948,829 B2 | 9/2005 | Verdes et al. |
| 6,956,243 B1 | 10/2005 | Chin |
| 6,964,878 B2 | 11/2005 | Horng et al. |
| 6,967,445 B1 | 11/2005 | Jewell et al. |
| 6,971,760 B2 | 12/2005 | Archer et al. |
| 6,974,924 B2 | 12/2005 | Agnatovech et al. |
| 6,982,518 B2 | 1/2006 | Chou et al. |
| 6,983,506 B1 | 1/2006 | Brown |
| 7,022,260 B2 | 4/2006 | Morioka |
| 7,042,150 B2 | 5/2006 | Yasuda |
| 7,058,103 B2 | 6/2006 | Ishida et al. |
| D525,374 S | 7/2006 | Maxik et al. |
| 7,073,920 B2 | 7/2006 | Konkle, Jr. et al. |
| 7,074,631 B2 | 7/2006 | Erchak et al. |
| 7,075,112 B2 | 7/2006 | Roberts et al. |
| 7,078,732 B1 | 7/2006 | Reeh et al. |
| D527,119 S | 8/2006 | Maxik et al. |
| 7,086,756 B2 | 8/2006 | Maxik |
| 7,086,767 B2 | 8/2006 | Sidwell et al. |
| D528,673 S | 9/2006 | Maxik et al. |
| D531,740 S | 11/2006 | Maxik |
| D532,532 S | 11/2006 | Maxik |
| 7,138,666 B2 | 11/2006 | Erchak et al. |
| 7,161,311 B2 | 1/2007 | Mueller et al. |
| 7,186,016 B2 | 3/2007 | Jao |
| 7,213,934 B2 | 5/2007 | Zarian et al. |
| 7,239,080 B2 | 7/2007 | Ng et al. |
| 7,241,039 B2 | 7/2007 | Hulse |
| 7,246,919 B2 | 7/2007 | Porchia et al. |

(56) References Cited

U.S. PATENT DOCUMENTS

| | | |
|---|---|---|
| 7,261,454 B2 | 8/2007 | Ng |
| 7,270,446 B2 | 9/2007 | Chang et al. |
| 7,288,798 B2 | 10/2007 | Chang et al. |
| 7,315,119 B2 | 1/2008 | Ng et al. |
| 7,319,293 B2 | 1/2008 | Maxik |
| 7,344,279 B2 | 3/2008 | Mueller et al. |
| 7,350,933 B2 | 4/2008 | Ng et al. |
| 7,367,692 B2 | 5/2008 | Maxik |
| 7,396,142 B2 | 7/2008 | Laizure, Jr. et al. |
| 7,489,031 B2 | 2/2009 | Roberts et al. |
| 7,513,669 B2 | 4/2009 | Chua et al. |
| 7,524,097 B2 | 4/2009 | Turnbull et al. |
| 7,550,319 B2 | 6/2009 | Wang et al. |
| 7,677,765 B2 | 3/2010 | Tajul et al. |
| 7,942,556 B2 | 5/2011 | Harbers et al. |
| 7,997,750 B2 | 8/2011 | Chiang |
| 8,075,172 B2 | 12/2011 | Davey et al. |
| 2001/0008436 A1 | 7/2001 | Gleckman |
| 2001/0009400 A1 | 7/2001 | Maeno et al. |
| 2001/0019134 A1 | 9/2001 | Chang et al. |
| 2001/0026447 A1 | 10/2001 | Herrera |
| 2001/0035264 A1 | 11/2001 | Padmanabhan |
| 2001/0053077 A1 | 12/2001 | Anwly-Davies et al. |
| 2002/0021573 A1 | 2/2002 | Zhang |
| 2002/0039872 A1 | 4/2002 | Asai et al. |
| 2002/0068775 A1 | 6/2002 | Munzenberger |
| 2002/0070449 A1 | 6/2002 | Yagi et al. |
| 2002/0085379 A1 | 7/2002 | Han et al. |
| 2002/0093287 A1 | 7/2002 | Chen |
| 2002/0097586 A1 | 7/2002 | Horowitz |
| 2002/0117692 A1 | 8/2002 | Lin |
| 2002/0126491 A1 | 9/2002 | Chen |
| 2002/0145863 A1 | 10/2002 | Stultz |
| 2002/0149312 A1 | 10/2002 | Roberts et al. |
| 2002/0153829 A1 | 10/2002 | Asai et al. |
| 2002/0154449 A1 | 10/2002 | Raphael et al. |
| 2002/0176246 A1 | 11/2002 | Chen |
| 2002/0183438 A1 | 12/2002 | Amarasekera et al. |
| 2002/0186538 A1 | 12/2002 | Kase et al. |
| 2002/0191416 A1 | 12/2002 | Wesson |
| 2003/0025449 A1 | 2/2003 | Rossner |
| 2003/0043579 A1 | 3/2003 | Rong et al. |
| 2003/0048632 A1 | 3/2003 | Archer |
| 2003/0058658 A1 | 3/2003 | Lee |
| 2003/0072156 A1 | 4/2003 | Pohlert et al. |
| 2003/0079387 A1 | 5/2003 | Derose |
| 2003/0111955 A1 | 6/2003 | McNulty et al. |
| 2003/0128629 A1 | 7/2003 | Stevens |
| 2003/0142508 A1 | 7/2003 | Lee |
| 2003/0164666 A1 | 9/2003 | Crunk |
| 2003/0185020 A1 | 10/2003 | Stekelenburg |
| 2003/0193841 A1 | 10/2003 | Crunk |
| 2003/0201903 A1 | 10/2003 | Shen |
| 2003/0230045 A1 | 12/2003 | Krause et al. |
| 2003/0231510 A1 | 12/2003 | Tawa et al. |
| 2004/0001338 A1 | 1/2004 | Pine |
| 2004/0004435 A1 | 1/2004 | Hsu |
| 2004/0004441 A1 | 1/2004 | Yano |
| 2004/0007980 A1 | 1/2004 | Shibata |
| 2004/0008525 A1 | 1/2004 | Shibata |
| 2004/0014414 A1 | 1/2004 | Horie et al. |
| 2004/0039274 A1 | 2/2004 | Benaron et al. |
| 2004/0039764 A1 | 2/2004 | Gonikberg et al. |
| 2004/0056600 A1 | 3/2004 | Lapatovich et al. |
| 2004/0085017 A1 | 5/2004 | Lee |
| 2004/0085758 A1 | 5/2004 | Deng |
| 2004/0101802 A1 | 5/2004 | Scott |
| 2004/0105262 A1 | 6/2004 | Tseng et al. |
| 2004/0113549 A1 | 6/2004 | Roberts et al. |
| 2004/0114352 A1 | 6/2004 | Jensen |
| 2004/0114367 A1 | 6/2004 | Li |
| 2004/0125034 A1 | 7/2004 | Shen |
| 2004/0125515 A1 | 7/2004 | Popovich |
| 2004/0127138 A1 | 7/2004 | Huang |
| 2004/0179355 A1 | 9/2004 | Gabor |
| 2004/0183458 A1 | 9/2004 | Lee |
| 2004/0187313 A1 | 9/2004 | Zirk et al. |
| 2004/0189262 A1 | 9/2004 | McGrath |
| 2004/0190305 A1 | 9/2004 | Arik et al. |
| 2004/0201673 A1 | 10/2004 | Asai |
| 2004/0207334 A1 | 10/2004 | Lin |
| 2004/0208002 A1 | 10/2004 | Wu |
| 2004/0211589 A1 | 10/2004 | Chou et al. |
| 2004/0217693 A1 | 11/2004 | Duggal et al. |
| 2004/0233661 A1 | 11/2004 | Taylor |
| 2004/0245912 A1 | 12/2004 | Thurk et al. |
| 2004/0257804 A1 | 12/2004 | Lee |
| 2004/0264192 A1 | 12/2004 | Nagata et al. |
| 2005/0007010 A1 | 1/2005 | Lee |
| 2005/0007770 A1 | 1/2005 | Bowman et al. |
| 2005/0011481 A1 | 1/2005 | Naumann et al. |
| 2005/0015029 A1 | 1/2005 | Kim |
| 2005/0018424 A1 | 1/2005 | Popovich |
| 2005/0023540 A1 | 2/2005 | Yoko et al. |
| 2005/0030761 A1 | 2/2005 | Burgess |
| 2005/0031281 A1 | 2/2005 | Nath |
| 2005/0036299 A1 | 2/2005 | Tsai |
| 2005/0036616 A1 | 2/2005 | Huang et al. |
| 2005/0047170 A1 | 3/2005 | Hillburger et al. |
| 2005/0052885 A1 | 3/2005 | Wu |
| 2005/0057187 A1 | 3/2005 | Catalano |
| 2005/0063185 A1 | 3/2005 | Monjo et al. |
| 2005/0067343 A1 | 3/2005 | Zulauf et al. |
| 2005/0068776 A1 | 3/2005 | Ge |
| 2005/0084229 A1 | 4/2005 | Babbitt et al. |
| 2005/0099787 A1 | 5/2005 | Hayes |
| 2005/0105302 A1 | 5/2005 | Hofmann et al. |
| 2005/0110191 A1 | 5/2005 | Lin |
| 2005/0110384 A1 | 5/2005 | Peterson |
| 2005/0111234 A1 | 5/2005 | Martin et al. |
| 2005/0129979 A1 | 6/2005 | Kambe et al. |
| 2005/0141221 A1 | 6/2005 | Yu |
| 2005/0151664 A1 | 7/2005 | Kolish et al. |
| 2005/0152136 A1 | 7/2005 | Konkle et al. |
| 2005/0162864 A1 | 7/2005 | Verdes et al. |
| 2005/0174065 A1 | 8/2005 | Janning |
| 2005/0174769 A1 | 8/2005 | Yong et al. |
| 2005/0174780 A1 | 8/2005 | Park |
| 2005/0179358 A1 | 8/2005 | Soules et al. |
| 2005/0180136 A9 | 8/2005 | Popovich |
| 2005/0180137 A1 | 8/2005 | Hsu |
| 2005/0190561 A1 | 9/2005 | Ng et al. |
| 2005/0207152 A1 | 9/2005 | Maxik |
| 2005/0207159 A1 | 9/2005 | Maxik |
| 2005/0217996 A1 | 10/2005 | Liu et al. |
| 2005/0224829 A1 | 10/2005 | Negley et al. |
| 2005/0230691 A1 | 10/2005 | Amiotti et al. |
| 2005/0233485 A1 | 10/2005 | Shishov et al. |
| 2005/0237995 A1 | 10/2005 | Puranik |
| 2005/0243539 A1 | 11/2005 | Evans et al. |
| 2005/0243550 A1 | 11/2005 | Stekelenburg |
| 2005/0243552 A1 | 11/2005 | Maxik |
| 2005/0255026 A1 | 11/2005 | Barker et al. |
| 2005/0258446 A1 | 11/2005 | Raos et al. |
| 2005/0259419 A1 | 11/2005 | Sandoval |
| 2005/0265039 A1 | 12/2005 | Lodhie et al. |
| 2005/0270780 A1 | 12/2005 | Zhang |
| 2005/0276034 A1 | 12/2005 | Malpetti |
| 2005/0276051 A1 | 12/2005 | Caudle et al. |
| 2005/0276053 A1 | 12/2005 | Nortrup et al. |
| 2005/0276072 A1 | 12/2005 | Hayashi et al. |
| 2005/0285494 A1 | 12/2005 | Cho et al. |
| 2006/0002110 A1 | 1/2006 | Dowling et al. |
| 2006/0007410 A1 | 1/2006 | Masuoka et al. |
| 2006/0034077 A1 | 2/2006 | Chang |
| 2006/0044803 A1 | 3/2006 | Edwards |
| 2006/0050514 A1 | 3/2006 | Opolka |
| 2006/0061985 A1 | 3/2006 | Elkins |
| 2006/0071591 A1 | 4/2006 | Takezawa et al. |
| 2006/0092644 A1 | 5/2006 | Mok et al. |
| 2006/0142946 A1 | 6/2006 | Goujon et al. |
| 2006/0145172 A1 | 7/2006 | Su et al. |
| 2006/0158886 A1 | 7/2006 | Lee |
| 2006/0176699 A1 | 8/2006 | Crunk |

(56) References Cited

U.S. PATENT DOCUMENTS

| | | |
|---|---|---|
| 2006/0187653 A1 | 8/2006 | Olsson |
| 2006/0193121 A1 | 8/2006 | Kamoshita |
| 2006/0193130 A1 | 8/2006 | Ishibashi |
| 2006/0198147 A1 | 9/2006 | Ge |
| 2006/0208260 A1 | 9/2006 | Sakuma et al. |
| 2006/0226772 A1 | 10/2006 | Tan et al. |
| 2006/0243997 A1 | 11/2006 | Yang et al. |
| 2006/0250802 A1 | 11/2006 | Herold |
| 2006/0255353 A1 | 11/2006 | Taskar et al. |
| 2006/0261359 A1 | 11/2006 | Huang |
| 2006/0273340 A1 | 12/2006 | LV |
| 2006/0274524 A1 | 12/2006 | Chang et al. |
| 2006/0289884 A1 | 12/2006 | Soules et al. |
| 2007/0018181 A1 | 1/2007 | Steen et al. |
| 2007/0057364 A1 | 3/2007 | Wang et al. |
| 2007/0086189 A1 | 4/2007 | Raos et al. |
| 2007/0090391 A1 | 4/2007 | Diamantidis |
| 2007/0090737 A1 | 4/2007 | Hu et al. |
| 2007/0120879 A1 | 5/2007 | Kanade et al. |
| 2007/0125982 A1 | 6/2007 | Tian et al. |
| 2007/0139949 A1 | 6/2007 | Tanda et al. |
| 2007/0153518 A1 | 7/2007 | Chen |
| 2007/0291490 A1 | 12/2007 | Tajul et al. |
| 2008/0013316 A1 | 1/2008 | Chiang |
| 2008/0048200 A1 | 2/2008 | Mueller et al. |
| 2008/0070331 A1 | 3/2008 | Ke |
| 2009/0001372 A1 | 1/2009 | Arik et al. |
| 2009/0201577 A1 | 8/2009 | LaPlante et al. |
| 2009/0324875 A1 | 12/2009 | Heikkila |
| 2010/0177534 A1 | 7/2010 | Ryu et al. |
| 2010/0259918 A1 | 10/2010 | Rains et al. |
| 2010/0301727 A1 | 12/2010 | Lenk et al. |
| 2011/0103064 A1 | 5/2011 | Coe-Sullivan et al. |
| 2011/0163280 A1 | 7/2011 | Rozhin et al. |

FOREIGN PATENT DOCUMENTS

| | | |
|---|---|---|
| JP | 7-99372 A | 4/1995 |
| JP | 33-51103 B2 | 9/2002 |
| WO | 02/061805 A2 | 8/2002 |
| WO | 2004/100213 A2 | 11/2004 |
| WO | 2005/060309 A2 | 6/2005 |
| WO | 2007/069119 A1 | 6/2007 |
| WO | WO-2009/146262 A1 | 12/2009 |

OTHER PUBLICATIONS

Non Final Office Action received for U.S. Appl. No. 12/299,049, mailed on Jun. 16, 2011, 74 pages.
Non Final Office Action received for U.S. Appl. No. 12/299,049, mailed on Mar. 16, 2012, 11 pages.
Final Office Action received for U.S. Appl. No. 12/299,003, mailed on Oct. 5, 2011, 16 pages.
Non Final Office Action received for U.S. Appl. No. 12/299,003, mailed on Apr. 15, 2011, 60 pages.
Non Final Office Action received for U.S. Appl. No. 12/299,003, mailed on Jun. 13, 2012, 23 pages.
Office Action received for Chinese Patent Application No. 200780015112.2, mailed on Apr. 8, 2010, 25 pages (16 pages of English translation and 9 pages of Office Action).
Final Office Action received for U.S. Appl. No. 12/299,049, mailed on Sep. 5, 2012, 15 pages.
Non Final Office Action received for U.S. Appl. No. 12/681,774, mailed on Oct. 4, 2012, 52 pages.
International Preliminary Report on Patentability and Written Opinion received for PCT Patent Application No. PCT/US2007/010469, issued on Nov. 4, 2008, 12 pages.
International Search Report received for PCT Patent Application No. PCT/US2007/010469, mailed on Aug. 7, 2008, 2 pages.
International Search Report received for PCT Patent Application No. PCT/US2007/010470, mailed on Sep. 29, 2008, 7 pages.
International Preliminary Report on Patentability and Written Opinion received for PCT Patent Application No. PCT/US2007/10470, issued on Nov. 27, 2008, 5 pages.
International Search Report and Written Opinion received for PCT Patent Application No. PCT/US2008/011365, mailed on Dec. 5, 2008, 6 pages.
International Preliminary Report on Patentability received for PCT Patent Application No. PCT/US2008/011365, mailed on Apr. 15, 2010, 7 pages.
Office Action received for New Zealand Patent Application No. 573336, mailed on Apr. 19, 2010, 2 pages.
International Search Report and Written Opinion mailed Dec. 3, 2012, for PCT/US2012/056437, 9 pages.

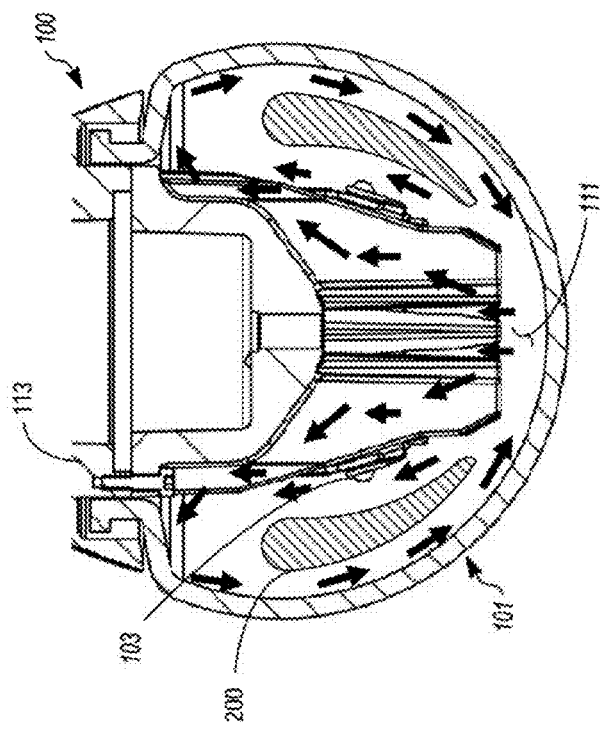
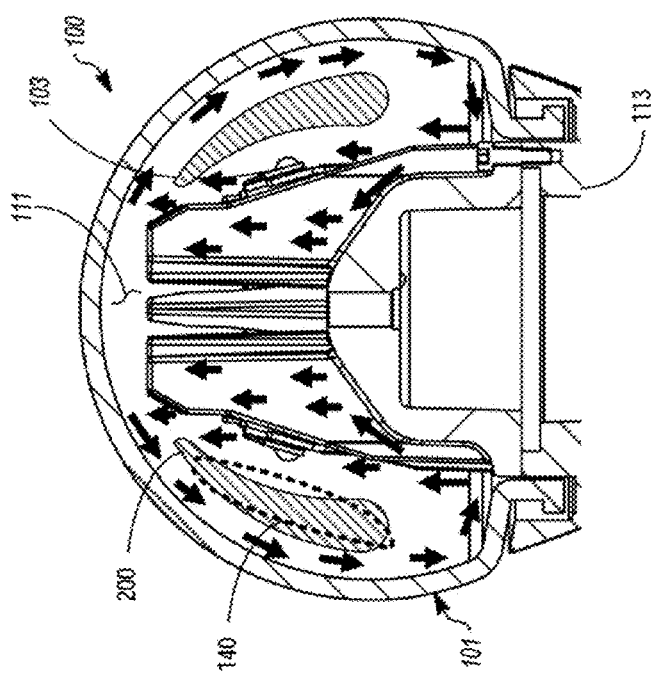
FIG. 3B
FIG. 3A

LED LIGHT BULB WITH CONTROLLED COLOR DISTRIBUTION USING QUANTUM DOTS

BACKGROUND

1. Field

The present disclosure relates generally to light-emitting diode (LED) bulbs, and more particularly, to an LED bulb that uses quantum dots to produce a tightly controlled color distribution.

2. Description of the Related Art

Traditionally, lighting has been generated using fluorescent and incandescent light bulbs. While both types of light bulbs have been reliably used, each suffers from certain drawbacks. For instance, incandescent bulbs tend to be inefficient, using only 2-3% of their power to produce light, while the remaining 97-98% of their power is lost as heat. Fluorescent bulbs, while more efficient than incandescent bulbs, do not produce the same warm light as that generated by incandescent bulbs. Additionally, there are health and environmental concerns regarding the mercury contained in fluorescent bulbs.

Thus, an alternative light source is desired. One such alternative is a bulb utilizing an LED. An LED comprises a semiconductor junction that emits light due to an electrical current flowing through the junction. Compared to a traditional incandescent bulb, an LED bulb is capable of producing more light using the same amount of power. Additionally, the operational life of an LED bulb is orders of magnitude longer than that of an incandescent bulb, for example, 10,000-100,000 hours as opposed to 1,000-2,000 hours.

While there are many advantages to using an LED bulb rather than an incandescent or fluorescent bulb, LEDs have a number of drawbacks that have prevented them from being as widely adopted as incandescent and fluorescent replacements. One drawback is that an LED, being a semiconductor, generally cannot be allowed to get hotter than approximately 120° C. As an example, A-type LED bulbs have been limited to very low power (i.e., less than approximately 8 W), producing insufficient illumination for incandescent or fluorescent replacements.

One approach to alleviating the heat problem of LED bulbs is to fill an LED bulb with a thermally-conductive liquid, to transfer heat from the LEDs to the bulb's shell. The heat may then be transferred from the shell out into the air surrounding the bulb.

Another drawback to an LED bulb is that LEDs tend to produce light that has a narrow emission band that may be centered at one end of the visible color spectrum. For example, one type of LED, based on gallium nitride (GaN), efficiently emits light over a relatively narrow emission profile centered at a peak wavelength in the blue region of the spectrum (approximately 450 nm). Gallium nitride LEDs are typically used because they can provide significantly brighter output light than other types of LEDs. However, the relatively narrow emission band, having a primarily blue color, may not produce the desired illumination qualities. For example, in some cases, it may be desirable that the LED provide a broader light emission spectrum that more closely resembles natural light. In other cases, it may be desirable that the LED provide a light emission that is precisely controlled to produce a tailored light emission spectrum.

Thus, it may be advantageous for an LED bulb to convert the narrow band of emitted wavelengths from an LED into a broader or specifically tailored light emission spectrum. To facilitate high-power operation, the light conversion technique should also be compatible with liquid-filled LED bulbs that use passive convection to maintain the temperature of the LED.

SUMMARY

In one exemplary embodiment, a liquid-cooled LED bulb includes a base and a shell connected to the base to form an enclosed volume. The liquid-cooled LED bulb also includes a plurality of LEDs attached to the base and disposed within the shell. The LED bulb also includes a thermally-conductive liquid held within the enclosed volume and a quantum dot material for adjusting the wavelength of light emitted from LED bulb.

In some embodiments, the quantum dot material is incorporated into a ring structure that is configured to facilitate a flow of the thermally conductive liquid from the LED mount to an inner surface of the shell. For example, the inside radius of the ring structure may be positioned a fixed distance from a light-emitting face of at least one of the plurality of LEDs. The distance being sufficient to facilitate passive convective flow of the thermally conductive liquid between the ring structure and the at least one LED. Also, the outside radius of the ring structure may be a fixed distance from an inner surface of the shell. The distance being sufficient to facilitate passive convective flow of the thermally conductive liquid between the ring structure and the shell.

A phosphor material may also be incorporated into the ring structure. The flow of the thermally conductive liquid is generally caused, at least in part, by natural convection. In some embodiments, the quantum dot material is dispersed within the thermally-conductive liquid. A phosphor material may also be dispersed in the thermally-conductive liquid.

DESCRIPTION OF THE FIGURES

FIGS. 3A and 3B depict cross-sectional views of an exemplary LED bulb with a ring structure.

DETAILED DESCRIPTION

Figure 1:
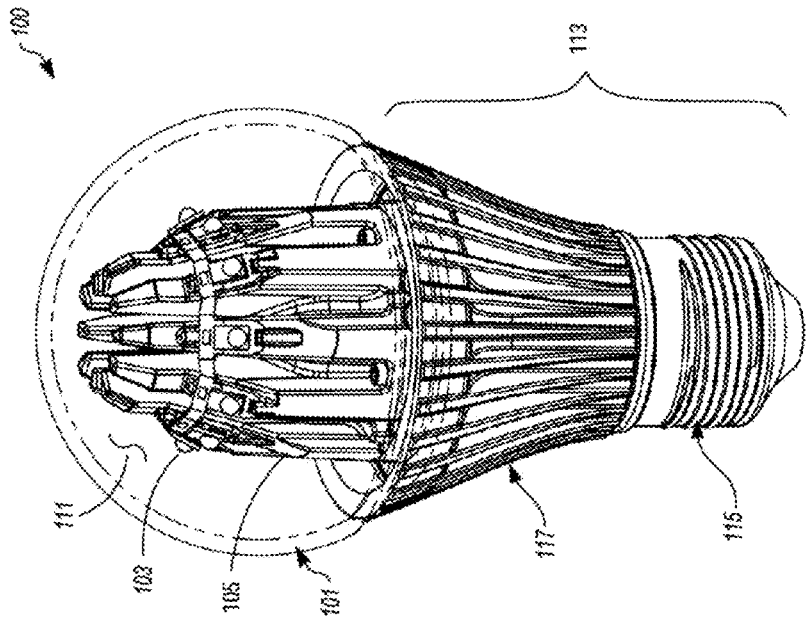
FIG. 1 depicts an exemplary LED bulb.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The following description includes an LED light bulb that uses a quantum dot material to control the spectrum of emitted light. In particular, the LED light bulb uses a quantum dot material that includes quantum dot crystals that are integrated into the LED bulb. In exemplary embodiments described below, the quantum dot material is integrated with a liquid-filled LED bulb that uses a thermally conductive liquid to cool the LED elements via passive convective flow. In one example, the quantum dot material is integrated with a ring structure that is shaped to facilitate the passive convective flow of the thermally-conductive liquid contained in the liquid-filled bulb.

Quantum dot crystals are small crystallized particles of semiconductor material generally ranging from 2 to 10 nanometers in diameter. When excited by an energy input, quantum dot crystals are capable of emitting photons in the visible spectrum. Quantum dot crystals may operate in a photoluminescence mode whereby the crystals are excited by photons from a light-source energy input. In a photoluminescence mode, a quantum dot crystal is able to absorb photons from a light source and produce a photon emission at a particular emission wavelength.

The emission wavelength of a quantum dot crystal depends, in part, on the size of the quantum dot crystal. By precisely controlling the size of the quantum dot crystals, the emission wavelength of the quantum dot crystals can also be precisely controlled. For example, a quantum dot crystal that is larger in size generally emits longer wavelength light (toward the red end of the spectrum) when compared to a quantum dot crystal that is smaller in size. Accordingly, by controlling the size and type of quantum dot crystals in an LED bulb, the emission spectrum of the LED bulb can be controlled to produce desired illumination qualities.

Various embodiments are described below, relating to LED bulbs that use a quantum dot material to control the quality of an illuminated light spectrum. There are two quantitative measures of the quality of illuminating light: a correlated color temperature (CCT) value and a color rendering index (CRI) value.

A CCT value represents the emitted color of the light source with respect to a black-body radiator that is heated to a temperature measured in Kelvin (K). Typically, "cool" white LEDs and fluorescent bulbs emit color that corresponds to CCT values ranging from 4000° to 6000° K. The "warm" colors emitted from an incandescent or halogen bulb correspond to CCT values ranging from approximately 2700° to 3600° K.

A CRI value represents the reflective qualities of a light source as compared to an ideal, natural light source (e.g., a broad-band solar emission). That is, the color of the light reflected from objects illuminated by the light source is compared to the color of light reflected using an ideal natural light source having a CRI value of 100. Light sources with a broader emission spectrum will typically have a CRI value that is closer to 100 than light sources with a narrow emission spectrum. That is, light sources with a broader emission spectrum will more closely match the quality of light reflected using a natural light source. In general, warm white light sources with a high CRI are the most desirable and appealing to the human eye.

1. Liquid-Filled LED Bulb

As used herein, an "LED bulb" refers to any light-generating device (e.g., a lamp) in which at least one LED is used to generate light. Thus, as used herein, an "LED bulb" does not include a light-generating device in which a filament is used to generate the light, such as a conventional incandescent light bulb. It should be recognized that the LED bulb may have various shapes in addition to the bulb-like A-type shape of a conventional incandescent light bulb. For example, the bulb may have a tubular shape, globe shape, or the like. The LED bulb of the present disclosure may further include any type of connector; for example, a screw-in base, a dual-prong connector, a standard two- or three-prong wall outlet plug, bayonet base, Edison Screw base, single-pin base, multiple-pin base, recessed base, flanged base, grooved base, side base, or the like.

FIG. 1 depicts an exemplary LED bulb 100 in a perspective view. In some embodiments, LED bulb 100 may use 6 W or more of electrical power to produce light equivalent to a 40 W incandescent bulb. In some embodiments, the LED bulb 100 may use 20 W or more to produce light equivalent to or greater than a 75 W incandescent bulb. Depending on the efficiency of the LED bulb 100, between 4 W and 16 W of heat energy may be produced when the LED bulb 100 is illuminated.

For convenience, all examples provided in the present disclosure describe and show LED bulb 100 being a standard A-type form factor bulb. However, as mentioned above, it should be appreciated that the present disclosure may be applied to LED bulbs having any shape, such as a tubular bulb, a globe-shaped bulb, or the like.

As depicted in FIG. 1, LED bulb 100 includes a base 113 and a shell 101, encasing various components of LED bulb 100, including LEDs 103. Shell 101 may be made from any transparent or translucent material such as plastic, glass, polycarbonate, or the like. Shell 101 may include dispersion material spread throughout the shell to disperse light generated by LEDs 103. The dispersion material prevents LED bulb 100 from appearing to have one or more point sources of light.

LED bulb 100 includes a plurality of LEDs 103 attached to LED mounts 105. LED mounts 105 may be made of any thermally conductive material, such as aluminum, copper, brass, magnesium, zinc, or the like. Since LED mounts 105 are formed of a thermally conductive material, heat generated by LEDs 103 may be conductively transferred to LED mounts 105. Thus, LED mounts 105 may act as a heat-sink or heat-spreader for LEDs 103. LED mounts 105 may be finger-shaped projections with LEDs 103 mounted on the sides, as shown in FIG. 1. The top portions of LED mounts 105 may be angled inward towards the center of LED bulb 100. The angled portions of LED mounts 105 may facilitate the passive convective flow of liquids within LED bulb 100. In another embodiment, LEDs 103 may be mounted on the top portions of LED mounts 105.

Base 113 of LED bulb 100 includes connector 115 for connecting the bulb to a lighting fixture. Base 113 of LED bulb 100 also includes heat-spreader 117. Heat-spreader 117 may be made of any thermally-conductive material, such as aluminum, copper, brass, magnesium, zinc, or the like. Heat-spreader 117 may be thermally coupled to one or more of shell 101, LED mounts 105, and/or a thermally-conductive liquid disposed in volume 111. Thermal coupling allows some of the heat generated by LEDs 103 to be conducted to and dissipated by heat-spreader 117. Preferably, LED bulb 100 is configured so that the operating temperature of heat spreader 113 does not reach levels at which it can burn a user, given the external placement of heat spreader 117.

The shell 101 and base 113 of LED bulb 100 interact to define an enclosed volume 111. A thermally-conductive liquid fills the volume 111. As used herein, the term "liquid" refers to a substance capable of flowing. Also, the substance used as the thermally conductive liquid is a liquid or at the liquid state within, at least, the operating, ambient-temperature range of the bulb. An exemplary temperature range includes temperatures between −40° C. to +40° C. The thermally conductive liquid may be mineral oil, silicone oil, glycols (PAGs), fluorocarbons, or other material capable of flowing. It may be desirable to have the liquid chosen be a non-corrosive dielectric. Selecting such a liquid can reduce the likelihood that the liquid will cause electrical shorts and reduce damage done to the components of LED bulb 100.

Also, it may be desirable for thermally conductive liquid to have a large coefficient of thermal expansion to facilitate passive convective flow. As used herein, "passive convective flow" refers to the circulation of a liquid without the aid of a fan or other mechanical devices driving the flow of the thermally conductive liquid.

Figure 2A:
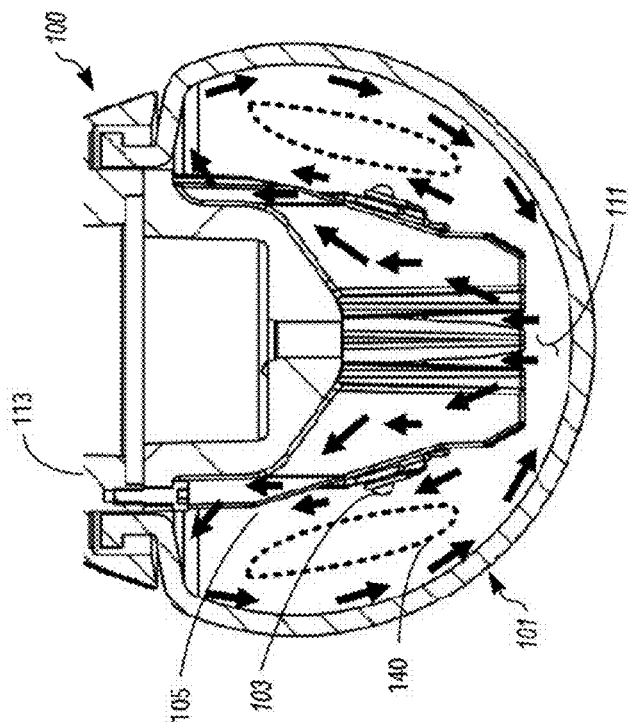
FIGS. 2A and 2B depict cross-sectional views of an exemplary LED bulb.
Figure 2B:
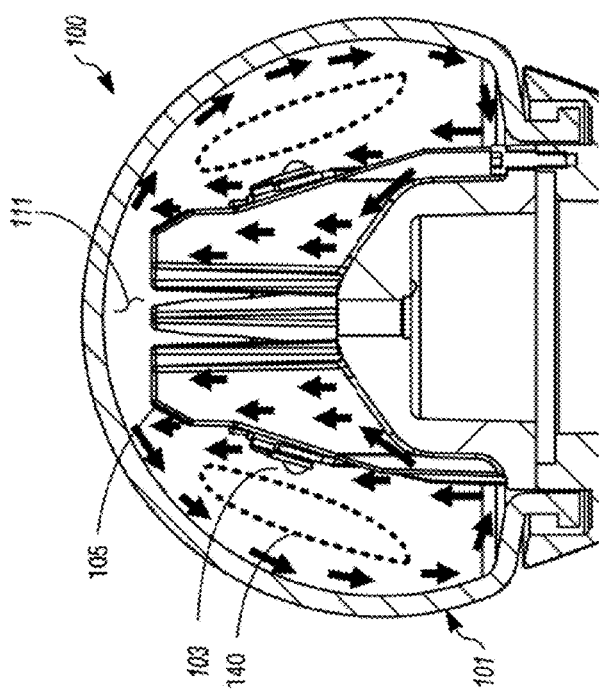

FIGS. 2A and 2B depict an exemplary passive convective flow of the thermally conductive liquid within the enclosed volume. As cells of thermally conductive liquid near the LEDs 103 and LED mounts 105 are heated, the cells of thermally conductive liquid become less dense and tend to rise within the enclosed volume 111. Cells of thermally conductive liquid near the shell 101 or base 113 may become cooler as the shell 101 or base 113 absorb heat from the thermally conductive liquid. As the cells of the thermally conductive liquid cool near the shell 101 or base 113, the cells become denser and tend to sink within the enclosed volume 111.

Due to the heat exchange between the LEDs 103, LED mounts 105, shell 101, and base 113, passive convective currents tend to flow as indicated by the arrows in FIGS. 2A and 2B. FIG. 2A depicts exemplary passive convective currents when the LED bulb 100 is in an upright position and FIG. 2B depicts exemplary passive convective currents when the LED bulb 100 is in an inverted position.

As shown in FIGS. 2A and 2B, the motion of the cells of the thermally conductive liquid may be further distinguished by zones with cells that are moving in the same direction, and dead zones 140, i.e., zones between cells of liquid that are moving in opposite directions. Within a dead zone 140, the shear force between cells of liquid moving in one direction and cells of liquid moving in the opposite direction slows the convective flow of liquid within the dead zone 140, such that liquid in dead zones 140 may not significantly participate in the convective flow nor efficiently carry heat away from the LEDs 103.

Because cells of the thermally conductive liquid within the dead zones 140 do not significantly participate in the convective heat transfer, the dead zones 140 may be suitable locations for placing optical components. The optical components may be used to alter optical qualities of the light emitted by the LED bulb. For example, as explained in more detail below, a ring structure including a quantum dot material can be placed in the dead zones 140 to alter the spectral emissions of the LED bulb. By placing the ring structure in or near the dead zones 140, the ring structure can be used to alter the emission spectrum of the LED bulb 100 while facilitating convective heat transfer by the thermally-conductive liquid. That is, in some embodiments, the ring structure can be placed within enclosed volume 111 of the LED bulb 100 in a location that does not significantly block or impede the natural convective flow of the thermally conductive liquid.

2. Liquid-Filled LED Bulb with a Quantum Dot Material

As previously mentioned, a quantum dot material can be used to control the light emitted by an LED bulb. To effectively control the emitted light of an LED bulb, the quantum dot material should be located in the LED bulb so that the quantum dot material is exposed to the light produced by the LEDs. The quantum dot material should also be integrated with the LED bulb in a way that does not significantly alter the performance of the LEDs or the convective heat transfer discussed above.

In some instances, the quantum dot material may be dispersed in the thermally conductive liquid contained in the enclosed volume. The light emitted from the LEDs can be transmitted through the optically translucent, thermally conductive liquid and absorbed by the quantum dot material suspended in the thermally conductive liquid. Light emitted from the quantum dot material can then be transmitted through the thermally conductive liquid to the bulb shell to produce the desired light emission.

In some instances, a phosphor material can also be dispersed in the thermally conductive liquid contained in the enclosed volume. Light emitted from the LEDs can be transmitted through the optically translucent, thermally conductive liquid and absorbed by the phosphor materials suspended in the thermally conductive liquid. The phosphor materials may work in conjunction with a quantum dot material to produce the desired light illumination.

However, in some cases, the quantum dot material may be sensitive to elevated temperatures and may degrade if in direct contact with surfaces above 100° C. As discussed above, when LEDs are powered, they produce heat and may operate at temperatures at or around 120° C. In some cases, quantum dot materials that come in direct contact with heated surfaces of the LEDs or LED mounts may become damaged or degraded. Therefore, in some cases, it is advantageous to minimize or eliminate contact between the LEDs (or LED mounts) and the quantum dot material.

To reduce or eliminate contact with high-temperature components, the quantum dot crystals may be integrated with a ring structure that surrounds the LEDs in the LED bulb. One or more phosphor materials may also be integrated with the ring structure and may work in conjunction with the quantum dot material to produce an illumination spectrum having particular qualities. The ring structure may be shaped to capture light emitted by the LEDs without significantly interfering with the natural convective currents of the thermally conductive liquid. In this way, the ring structure can be used to alter the optical qualities of the light emitted by the LED bulb while facilitating flow of the thermally conductive liquid.

FIGS. 3A and 3B depict a cross section of an LED bulb 100 with a ring structure 200 that is placed in the enclosed volume 111. FIGS. 3A and 3B also depict exemplary convective currents in an LED bulb 100 placed in two different orientations. As shown in FIG. 3A, the profile of the ring structure 200 at least partially overlaps the dead zones 140 of the thermally conductive liquid. In some cases, the profile of the ring structure is approximately congruent with the dead zones 140.

A ring structure 200 positioned as shown in FIGS. 3A and 3B may facilitate convective flow of the thermally conductive liquid from the LEDs 103 to the inner surface of the shell 101. For example, as shown by the directional flow arrows in FIGS. 3A and 3B, when the ring structure 200 is installed as shown, cells of the thermally conductive liquid are still allowed to pass by the surface of LEDs 103 to absorb heat produced by the LEDs 103. The cells of the thermally conductive liquid are also still allowed to pass by the inner surface of the shell 101 and base 113 so that heat can be dissipated from the thermally conductive liquid to the environment. Thus, as shown in FIGS. 3A and 3B, the convective currents are not significantly impeded by the presence of the ring structure 200.

The ring structure 200 should also be positioned near the LEDs 103 so that a significant portion of the light emitted from the LEDs 103 can be absorbed by the quantum dot material integrated with the ring structure 200. That is, the ring structure 200 should be appropriately shaped and placed in a location so that the ring structure 200 can cover a portion of the field of view of the LEDs 103. Exemplary ring structure embodiments are shown in FIGS. 5A, 5B, 6A, and 6B. One advantage of a properly shaped ring structure 200 is that the light distribution produced by the LED bulb 100 may be more uniform.

Accordingly, the ring structure 200 shown in FIGS. 3A and 3B allows the quantum dot material to absorb the light emitted by the LEDs 103 with a reduced risk of direct contact with heated surfaces. Keeping the quantum dot material away from the LEDs 103 (and other hot elements in the LED bulb) helps protect the quantum dot crystals from exposure to excessive heat and may increase the life of the quantum dot material.

Figure 4:
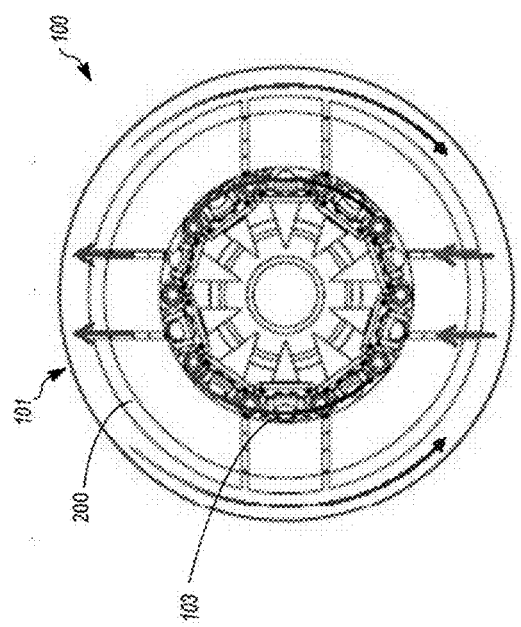
FIG. 4 depicts an LED bulb with a ring structure.

In some embodiments, the ring structure 200 may be configured to facilitate the natural convective flow of the thermally conductive liquid when the LED bulb is in multiple orientations. For example, FIG. 4 depicts a front view of an LED bulb 100 in a horizontal orientation with a ring structure 200 installed. As indicated by the arrows in FIG. 4, the ring structure 200 includes channels that facilitate natural convective flow of the thermally conductive liquid when the LED bulb is positioned as shown in FIG. 4. With the ring structure 200 installed, the cells of the thermally conductive liquid are still allowed to pass by the surface of LEDs 103 to absorb heat produced by the LEDs 103. The cells of the thermally conductive liquid are also allowed to pass through the channels of the ring structure 200 and to the inner surface of the shell 101 so that heat can be dissipated from the thermally conductive liquid to the surrounding environment.

Figure 5A:
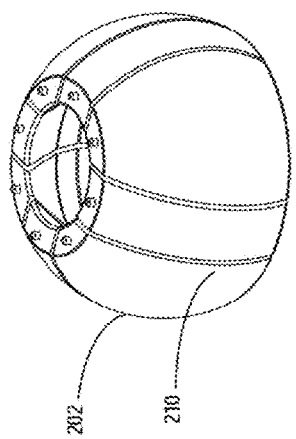
FIGS. 5A and 5B depict an exemplary ring structure.
Figure 5B:
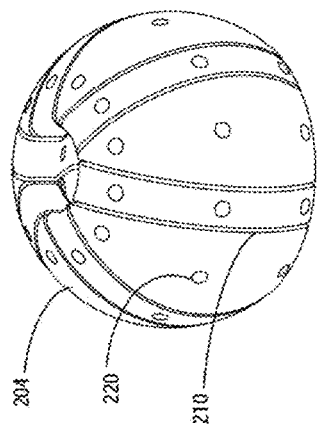

FIGS. 5A and 5B depict one exemplary embodiment of a ring structure 202. In general, the outer dimensions of the ring structure 202 should be less than the inside dimensions of the shell to facilitate naturally convective flow of the thermally conductive liquid when the ring structure is installed in an LED bulb. In some cases, the gap between the outer surface of the ring structure 202 and the inner surface of the shell is at least 2 mm. Also, the inside dimensions of the ring structure 202 should be sized so that there is a gap between the inner surface of the ring structure 202 and the LEDs, when the ring structure 202 is installed in the LED bulb. In some cases, the gap between the LEDs and the inner surface of the ring structure 202 is at least 2 mm.

The ring structure 202 depicted in FIGS. 5A and 5B also includes channels 210 that also facilitate naturally convective flow of the thermally conductive liquid, when the LED bulb is placed in certain orientations. For example, as shown in FIG. 4, the channels 210 may facilitate naturally convective flow of the thermally conductive liquid when the LED bulb is oriented horizontally. In some cases, the channels 210 may also facilitate naturally convective flow of the thermally conductive liquid when the LED bulb is oriented in positions as shown in FIGS. 3A and 3B. That is, the channels 210 allow cells of the thermally conductive liquid to pass by the inner surface of the shell and dissipate heat. In some cases, the channels 210 facilitate enough flow to enable the gap between the outer surface of the ring structure 202 and the inner surface of the shell to be very small or zero.

The ring structure 202 depicted in FIGS. 5A and 5B may be hollow or empty so that the thermally conductive liquid is displaced by the ring structure 202. In some alternative embodiments, the ring structure 202 is a solid material, such as an injection-molded plastic.

Figure 6A:
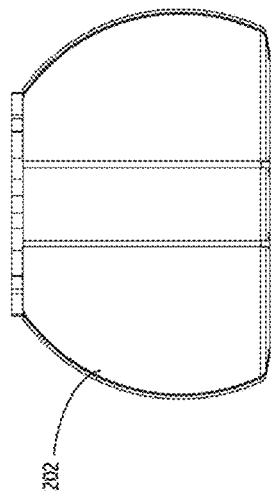
FIGS. 6A and 6B depict an exemplary ring structure.
Figure 6B:
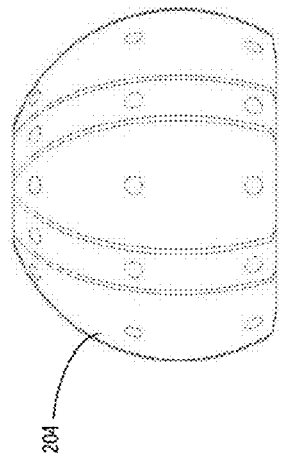

FIGS. 6A and 6B depict another exemplary embodiment of a ring structure 204. The dimensions of ring structure 204 are also sized to facilitate naturally convective flow of the thermally conductive liquid when the ring structure 204 is installed in an LED bulb. The ring structure 204 of FIGS. 6A and 6B also includes channels 210 to facilitate naturally convective flow of the thermally conductive liquid, when the LED bulb is placed in certain orientations. The ring structure 204 of FIGS. 6A and 6B also includes holes 220 that also facilitate naturally convective flow by allowing the thermally conductive liquid to pass through the ring structure 204 when the LED bulb is in certain orientations.

A quantum dot material can be deposited on the inside or outside surface of any ring structure embodiment (200, 202, or 204) included in the embodiments discussed above. In some cases, the ring structure (200, 202, or 204) is hollow and the quantum dot material is deposited on the inside of the ring structure (200, 202, or 204), and therefore the quantum dot material is not exposed to the thermally conductive liquid when the ring structure is installed in an LED bulb. In some cases, the quantum dot material is dispersed within the ring structure material.

In some cases one or more phosphor materials is also integrated in the ring structure (200, 202, or 204). The phosphor material may be deposited on the same or a different face as the quantum dot material. The phosphor material may also be dispersed within the ring structure material.

3. Spectrum Shifting using a Quantum Dot Material

In some instances, it may be advantageous to use an LED bulb having a broad or specifically tailored light emission spectrum. However, traditionally, LEDs emit light across a relatively narrow spectrum of wavelengths. For example, one type of LED, using a gallium nitride material, emits light having a primarily blue color (approximately 450 nm). While gallium nitride LEDs provide significantly brighter output light than other types of LEDs, the narrow emission spectrum and blue color of a gallium nitride LED may not produce the desired illumination qualities.

The embodiments discussed below illustrate how a quantum dot material can be used to shift or alter the color emitted from traditional LEDs to produce a broader spectrum emission. In some embodiments, a quantum dot material is combined with one or more phosphor materials to obtain a desired emissions spectrum.

Figure 7:
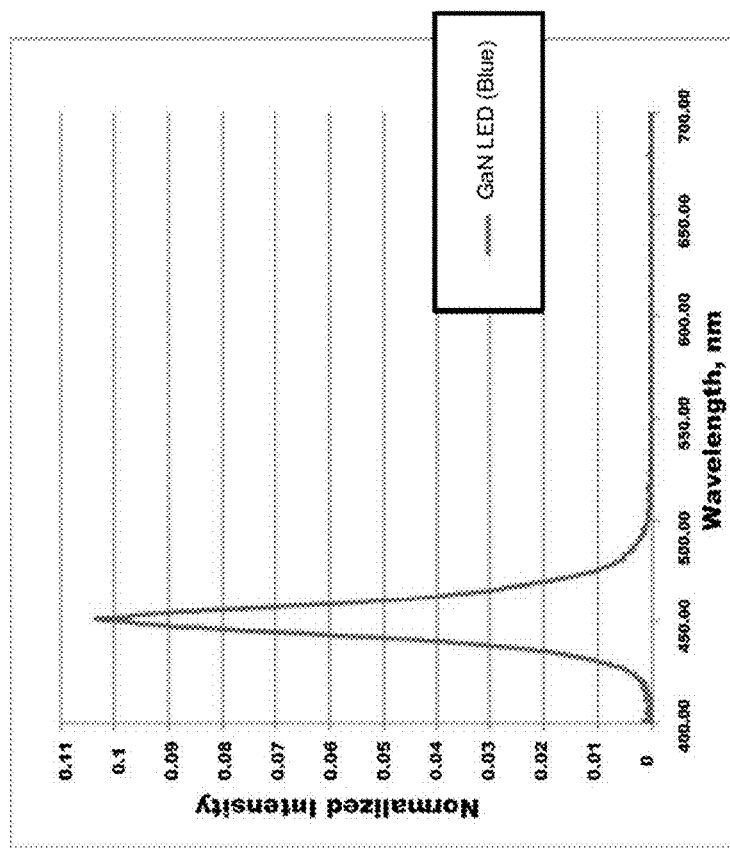
FIG. 7 depicts an emissions spectrum of a blue LED.

FIG. 7 depicts an emission spectrum of a gallium nitride LED ("blue") producing light with a peak intensity centered at approximately 450 nm. Typically, the narrow band of blue light produced by a gallium nitride LED is unsuitable for illumination purposes.

Figure 8:
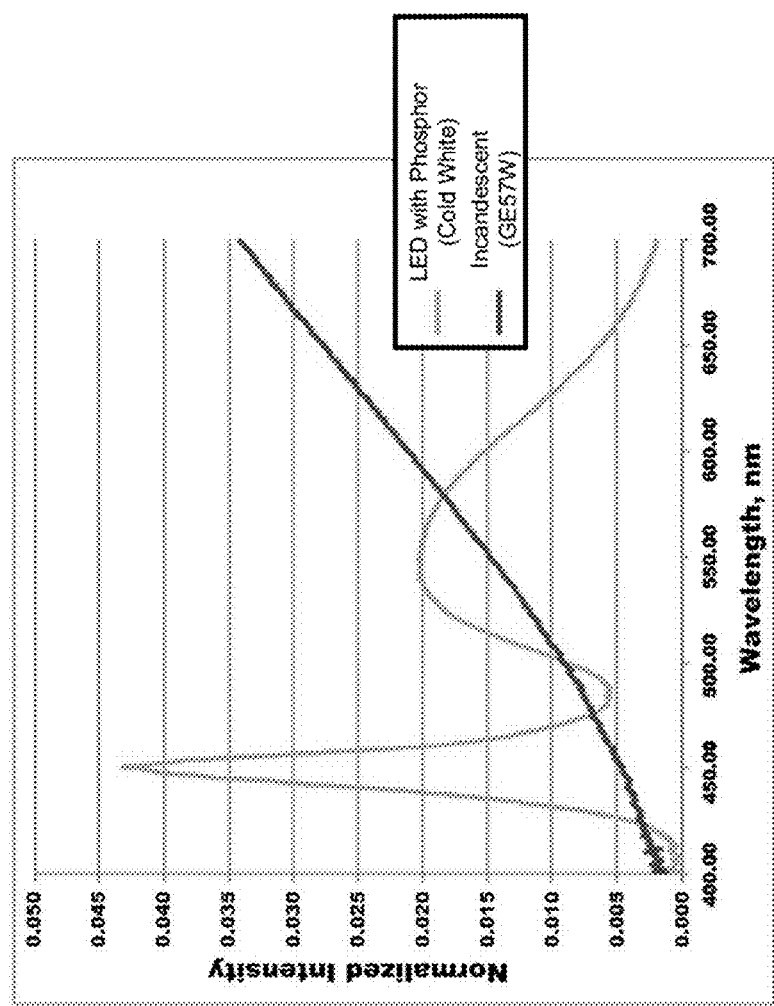
FIG. 8 depicts an emissions spectrum of a cold white LED and an emissions spectrum of an incandescent bulb.

FIG. 8 depicts an emission spectrum of an exemplary traditional warm white incandescent bulb ("GE57W"). An incandescent light source with the emission spectrum shown in FIG. 8 may have an associated CCT value less than 3000° K. and a CRI value greater than 90. Also shown in FIG. 8, the emission spectrum of the incandescent bulb includes longer wavelength or red-color components. To an observer, the light from the incandescent bulb may appear to have a soft, warm tone, and in some lighting scenarios, the perceived warmer tone is more desirable.

In some cases, a phosphor coating can be deposited on a gallium nitride LED to convert the blue light produced by a gallium nitride LED to a broader emission spectrum. FIG. 8 depicts an exemplary emission spectrum of a gallium nitride LED with a phosphor coating ("cold white"). As shown in FIG. 8, the emission spectrum of the cold white LED has a reduced emission intensity near the blue region of the spectrum and an increased emission intensity toward the red region of the spectrum. Specifically, the emission spectrum of the cold white LED shown in FIG. 8 has a reduced emissions peak centered at approximately 450 nm and an increased emissions peak centered at approximately 550 nm. In some cases, the emission spectrum of the LED with a phosphor coating will have a CCT value of approximately 6550° K. and a CRI value of approximately 73.0. Thus, the emission spectrum has shifted toward the red end of the color spectrum. The emission of the cold white LED may be perceived as having a warmer tone than the emission of the blue LED shown in FIG. 7.

While the cold white emission spectrum may be an improvement over the blue gallium nitride LED, there are a number of disadvantages. First, as shown in FIG. 8, the cold white LED does not closely resemble the emission spectrum of a warm white incandescent bulb. Specifically, the cold white emission has a pronounced blue color spike centered at approximately 450 nm. Second, by using phosphors to convert the LED light into a broader or red-shifted color output, there may be a reduction in the amount of visible light produced resulting in a reduction in efficiency. In particular, the phosphors are likely to convert at least some of the LED light into wavelengths that are outside of the visible range. For example, a portion of the LED light may be converted into emissions in the infra red portion of the energy spectrum which results in wasted heat energy. In general, the larger the red shift that is produced by the phosphor coating, the lower the efficiency of the light conversion. Last, for scenarios that require a specifically tailored color illumination, it may be difficult to formulate a phosphor coating that can conform to a precise emission spectrum.

In some cases, a quantum dot material can be used to produce an LED bulb with a broad or specifically tailored light emission spectrum. In particular, quantum dot materials can be used to produce an LED bulb with a red-shifted color spectrum. In a photoluminescence mode, a quantum dot material absorbs pump light produced by the LED and emits light at a different wavelength. As previously mentioned, the wavelength of the emitted light depends, in part, on the type and size of crystals in the quantum dot material. By precisely controlling the type and size of quantum dot material used, the emission spectrum can also be precisely controlled. By precisely controlling the emission spectrum, the conversion losses (discussed above) can be minimized. In some cases, the emission spectrum of an LED can be shifted to the red end of the color spectrum while minimizing the amount of infra red light that is produced. This allows for a LED bulb with a perceived warmer emitted light without significantly reducing efficiency. In some cases, the quantum dot material can be formulated to produce a specific color quality as measured by CCT and CRI values, discussed above.

Figure 9:
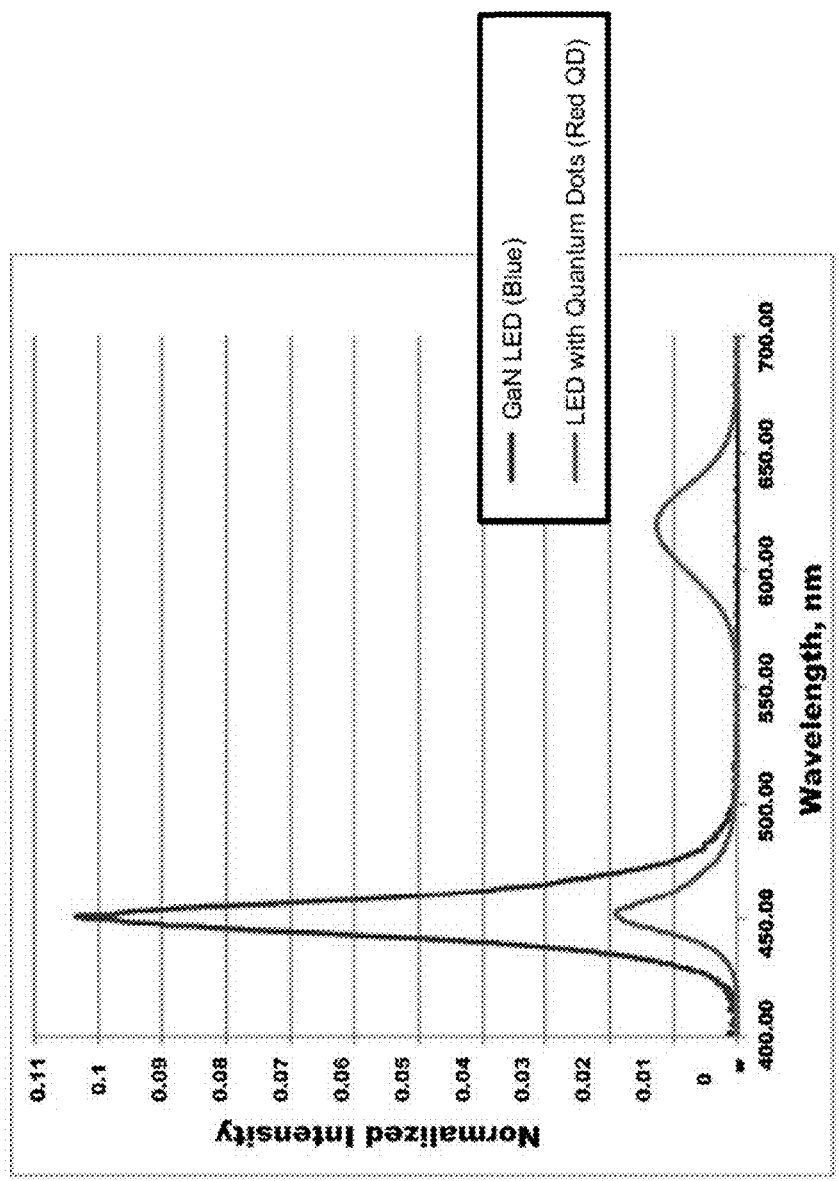
FIG. 9 depicts an emissions spectrum of a blue LED and an emissions spectrum of an LED with quantum dots.

FIG. 9 depicts an emissions spectrum of a blue LED ("blue") compared to an emission spectrum of a blue LED used with a quantum dot material ("Red QD"). The quantum dot material used in this example included quantum dot crystals ranging from 2 nm to 10 nm in size. As evidenced by the red-shifted emission spectrum of the LED with quantum dots, some of the blue LED light at 450 nm is absorbed by the quantum dots and emitted as red-shifted components at approximately 620 nm. As mentioned above, the wavelength of the light emitted by the quantum dots can be controlled by controlling the type and size of the quantum dot crystals. Thus, a quantum dot material can be formulated to produce a specific emission spectrum. This may be advantageous in certain lighting scenarios where a specifically tailored emission spectrum is desired. Also, the quantum dot material can be formulated to reduce or minimize inefficiencies due to the wavelength conversion (e.g., conversion of LED light into non-visible energy).

FIG. 9 depicts an exemplary wavelength shift having emission peaks centered at approximately 450 nm and 620 nm, resulting in a CCT value of approximately 1700° K. However, by using a quantum dot material with different types and sizes of quantum dot crystals, alternative emission spectrums can be generated.

In some embodiments, an LED (with or without) a phosphor can be combined with a quantum dot material to generate an emission spectrum having the desired properties. For example, an LED bulb with a quantum dot material may red-shift the emission spectrum of an LED, resulting in an LED bulb emitting light having a CCT value of 1000° K. less than an LED bulb without quantum dots. For example, an LED and phosphor combination having a CCT value of approximately 6400° K. can be combined with a quantum dot material to produce an LED bulb that produces light with a CCT value of approximately 5400° K. Similarly, an LED bulb with a different quantum dot material may red-shift the emission spectrum of a blue LED, resulting in a LED bulb emitting light having a CCT value more than 5000° K. lower than the CCT value of an LED bulb without quantum dots.

Figure 10:
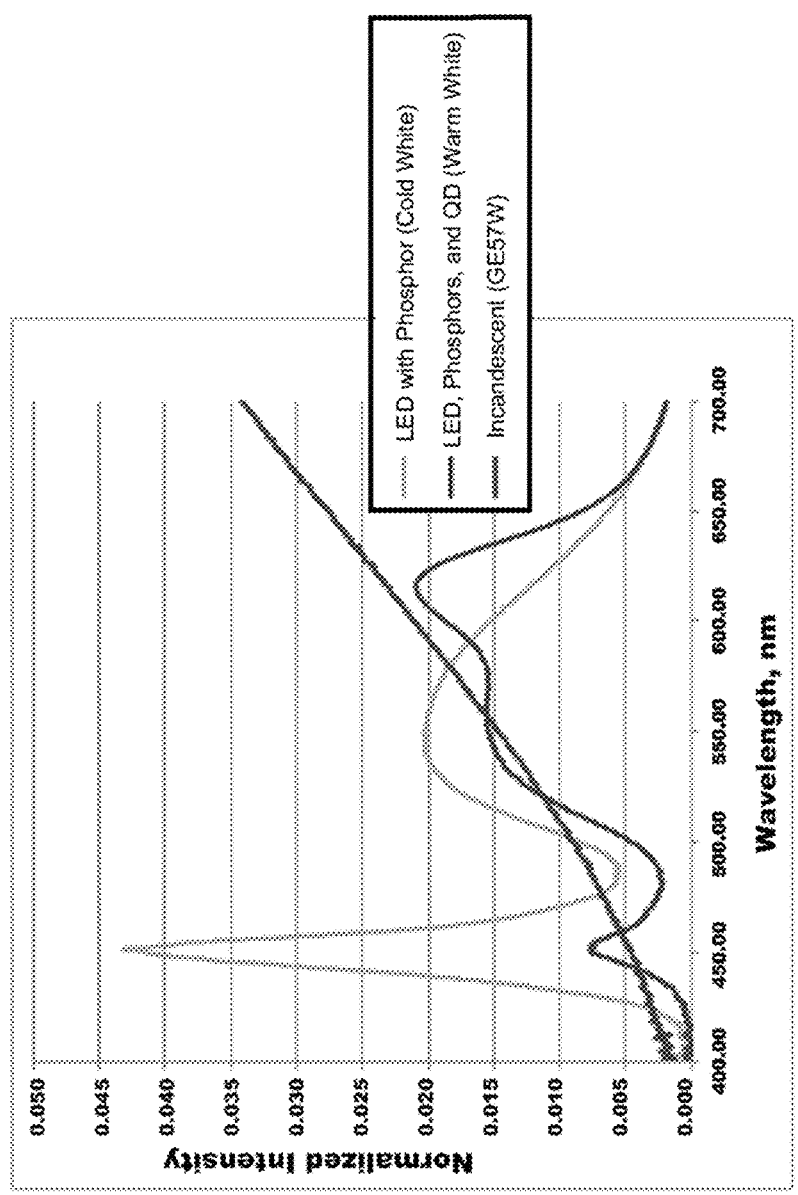
FIG. 10 depicts an emissions spectrum of a cold white LED, an emissions spectrum of an incandescent bulb, and an emissions spectrum of an LED with quantum dots.

An LED can also be combined with both phosphor coatings and quantum dot materials to produce a device having a broad or specifically tailored emission spectrum. FIG. 10 depicts emission spectrums of an incandescent bulb ("GE57W"), an emission spectrum of an LED with a phosphor coating ("cold white"), and an emission spectrum of an LED with a phosphor coating and quantum dot material ("warm white"). As shown in FIG. 10, the emission spectrum of the warm white LED more closely matches the emission spectrum of the incandescent bulb, as compared to the cold white LED. Specifically, the quantum dots in the warm white LED have absorbed the wavelength components from the blue portion of the spectrum and emit light having a longer wavelength (or toward the red end of the spectrum). The blue color spike visible in the cold white emission spectrum is much less pronounced in the emission spectrum of the warm white LED. Also, the red portion of the emission spectrum for the warm white LED more closely matches the emission spectrum of the incandescent bulb, as compared to the cold white LED. In some cases, the emission spectrum of the LED with a phosphor coating and quantum dot material will have a CCT value of approximately 3180° K. and a CRI value of approximately 80.

Table 1, below, compares the emission spectrum of the cold white LED with the emission spectrum of the warm white LED shown in FIG. 10. In general, the warm white LED exhibits an increase in the peak, dominant, and center wavelength, as compared to the cold white LED; this indicates a red-shift of the emission spectrum. The warm white LED also exhibits a decrease in the CCT value as compared to the cold white LED; this also indicates a red-shift in the emission spectrum. The red-shift may be perceived as a change from a cool white illumination to a warmer illumination.

TABLE 1

| Property | Cold White LED (no quantum dots) | Warm White LED (with quantum dots) |
| --- | --- | --- |
| Peak Wavelength | 451.1 nm | 617.2 nm |
| Dominant Wavelength | 491.3 nm | 578.3 nm |
| Center Wavelength | 450.0 nm | 581.4 nm |
| CCT Value | 6550° K | 3180° K |
| CRI Value | 73.00 | 80.00 |

In some cases, the LED bulb may include a quantum dot material to produce a light emission having a CCT value of less than 3000° K. and a CRI value greater than 90. In some cases, the LED bulb may include both a quantum dot material and a phosphor material to produce a light emission having a CCT value of less than 3000° K. and a CRI value greater than 90.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching.

What is claimed is:

1. A liquid-cooled light-emitting diode (LED) bulb comprising: a base; a shell connected to the base forming an enclosed volume; a plurality of LEDs attached to the base and disposed within the shell; a thermally-conductive liquid held within the enclosed volume; and a ring structure including a quantum dot material for adjusting the wavelength of light emitted from LED bulb, wherein the ring structure is configured to facilitate a flow of the thermally conductive liquid from the LED mount to an inner surface of the shell, wherein an inside radius of the ring structure is spaced apart from a light-emitting face of at least one of the plurality of LEDs, and wherein an outside radius of the ring structure is spaced apart from the inner surface of the shell.

2. The liquid-cooled LED bulb of claim 1, wherein the flow of thermally conductive liquid is caused, at least in part, by natural convection.

3. The liquid-cooled LED bulb of claim 1, wherein the quantum dot material comprises quantum dot crystals having sizes ranging between from 2 to 10 nanometers in diameter.

4. The liquid-cooled LED bulb of claim 1, wherein the ring structure including the quantum dot material is configured to absorb light emitted from the LEDs having a first correlated color temperature (CCT) value to produce an emitted light having an emitted CCT value that is at least 1000° K. lower than the first CCT value.

5. The liquid-cooled LED bulb of claim 1, wherein the ring structure including the quantum dot material is configured to absorb light emitted from the LEDs having a first correlated color temperature (CCT) value to produce an emitted light having an emitted CCT value that is at least 5000° K. lower than the first CCT value.

6. The liquid-cooled LED bulb of claim 1, wherein the ring structure is a hollow toroid surrounding the plurality of LEDs and the quantum dot material is disposed on an interior surface of the ring structure.

7. The liquid-cooled LED bulb of claim 1, wherein the ring structure is a solid toroid surrounding the plurality of LEDs and the quantum dot material is dispersed in the solid volume of the ring structure.

8. The liquid-cooled LED bulb of claim 1, wherein the ring structure is a solid toroid surrounding the plurality of LEDs and the quantum dot material is disposed on an exterior surface of the ring structure.

9. A liquid-cooled light-emitting diode (LED) bulb comprising: a base; a shell connected to the base forming an enclosed volume; a plurality of LEDs attached to the base and disposed within the shell; a thermally-conductive liquid held within the enclosed volume; and a ring structure including a quantum dot material and one or more phosphor materials for adjusting the wavelength of light emitted from LED bulb, wherein the ring structure is configured to facilitate a flow of the thermally conductive liquid from the LED mount to an inner surface of the shell, wherein an inside radius of the ring structure is spaced apart from a light-emitting face of at least one of the plurality of LEDs, and wherein an outside radius of the ring structure is spaced apart from the inner surface of the shell.

10. The liquid-cooled LED bulb of claim 9, wherein the quantum dot material and one or more phosphor materials produce light having a correlated color temperature (CCT) value lower than 3000° K. and color rendering index (CRI) value greater than 90.

11. The liquid-cooled LED bulb of claim 9, wherein the thermally conductive liquid is able to facilitate natural convective cooling for the LEDs.

12. The liquid-cooled LED bulb of claim 9, wherein the quantum dot material comprises quantum dot crystals having sizes ranging between from 2 to 10 nanometers in diameter.

13. The liquid-cooled LED bulb of claim 9, wherein the quantum dot material is configured to absorb light emitted from the LEDs at substantially near 450 nm and emit light from the quantum dot material at a wavelength substantially longer than 450 nm.

14. The liquid-cooled LED bulb of claim 9, wherein the quantum dot material is configured to absorb light emitted from the LEDs having a first correlated color temperature (CCT) value to produce an emitted light having an emitted CCT value that is at least 1000° K. lower than the first CCT value.

15. The liquid-cooled LED bulb of claim 9, wherein the quantum dot material is configured to absorb light emitted from the LEDs having a first correlated color temperature (CCT) value to produce an emitted light having an emitted CCT value that is at least 5000° K. lower than the first CCT value.

* * * * *